July 11, 1950  F. J. IRVING  2,514,394
COUPLING
Filed Jan. 9, 1945

INVENTOR
FRANK J. IRVING
BY Hazard & Miller
ATTORNEYS

Patented July 11, 1950

2,514,394

UNITED STATES PATENT OFFICE 2,514,394

COUPLING

Frank J. Irving, Reno, Nev.

Application January 9, 1945, Serial No. 571,995

3 Claims. (Cl. 64—15)

1

This invention relates to improvements in flexible couplings designed to provide a driving or torque transmitting connection between two approximately aligned shafts such as, for example, a motor driven driving shaft which serves to drive a driven shaft.

An object of the present invention is to provide an improved flexible coupling consisting of two opposed hubs or bushings applicable to the driving and driven shafts respectively which are connected by a helical spring which serves to transmit the torque from one hub or bushing to the other hub or bushing. Heretofore, flexible couplings of this general character have been designed, but, in many instances, the ends of the spring are bent laterally to fit into recesses arranged on the bushings to lock them in place. When the end of the springs are bent either laterally or radially or in a direction parallel to the axis of the spring, the laterally bent ends, on being subjected to heavy stresses and reversals of stress, frequently break off. In other designs heretofore developed, the ends of the spring are not bent laterally but merely butt against suitable abutments on the hubs or bushings so that the torque transmitted between the hubs and the spring is in the form of a direct thrust. In such constructions no provision has been made to anchor the ends of the spring to the hubs or bushings to prevent the coupling from loosening whenever the driven shaft tends to overrun the driving shaft.

More specifically, an object of the present invention is to provide an improved coupling wherein the ends of the spring are not bent laterally but extend into recesses formed to receive them in the hubs or bushings and which are effectively locked in place therein. In this manner danger of the ends of the spring breaking is eliminated and the coupling will not loosen in the event that the driven shaft overruns the driving shaft or the driving shaft is operated in a reversed direction.

Another object of the invention is to provide an improved flexible coupling wherein provision is made for silencing the coupling against objectionable noise.

With the foregoing and other objects in view, which will be made manifest in the following detailed description and specifically pointed out in the appended claims, reference is had to the accompanying drawings for an illustrative embodiment of the invention, wherein:

Fig. 1 is a view in side elevation of the improved flexible coupling, illustrating it as having been applied to approximately aligned shafts.

2

Figure 1:
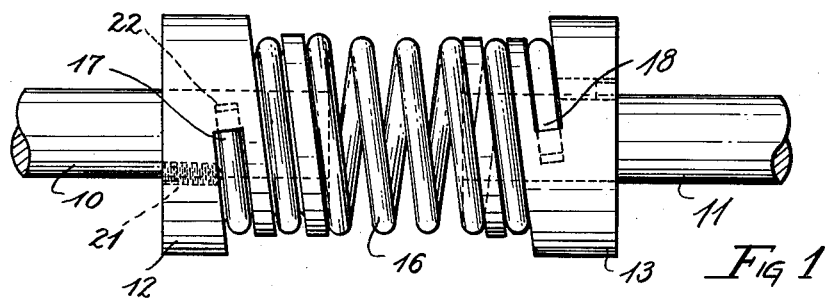
Figure 2:
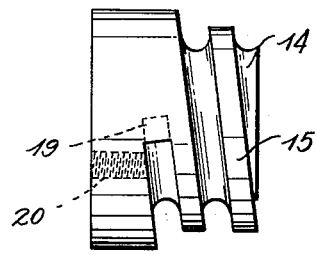
Fig. 2 is a view in side elevation of one of the hubs or bushings forming a part of the improved coupling.
Figure 3:
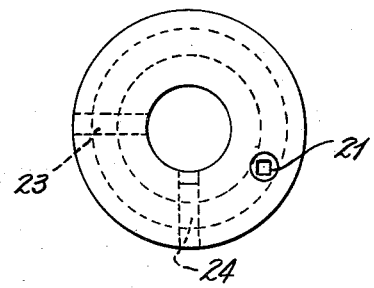
Fig. 3 is a view in end elevation of the bushing illustrated in Fig. 2.

Referring to the accompanying drawings wherein similar reference characters designate similar parts throughout, 10 and 11 indicate two approximately aligned shafts either of which may be considered as the driving shaft and the other as the driven shaft. The coupling consists of two opposed hubs or bushings 12 and 13 applicable to the two shafts. Each hub or bushing has a shank portion 14 of somewhat reduced diameter and on the shank portion there are formed thread formations 15 corresponding in diameter and pitch to the convolutions of a helical spring 16. The helical spring is preferably formed of cold rolled steel, although the present invention is not restricted thereto. As will be noted from Fig. 1 the ends 17 and 18 of this spring are not bent laterally but continue on the same diameter and pitch as the remaining convolutions of the spring. In the large portions of the hubs at the ends of the thread formations 15 there are formed recesses 19 of a size and shape to receive the extreme ends of the spring. Drilled and tapped holes 20 extend longitudinally through the larger portions of the bushings to communicate with the thread formation adjacent each recess 19. These drilled and tapped holes are designed to receive set screws 21 which, on being tightened, will engage the spring near the ends thereof adjacent the recesses 19. In the preferred form of construction after the set screws are screwed into their holes the outer ends of the holes are burred or peened over to lock the set screws against unscrewing from within their holes.

If the hubs or bushings 12 and 13 are formed of relatively soft material such as brass, hard thrust discs 22 are positioned in the bottoms of the recesses 19 against which the ends of the spring may bear. On the other hand if the hubs or bushings are formed of steel or equivalent hard material, these thrust discs may be replaced by fiber discs where reduction of noise is desirable. 23 and 24 indicate radially arranged holes that may be formed in the hubs or bushings to receive set screws designed to enter keyways on the shafts. In some forms of construction, however, instead of attaching the hubs of bushings 12 and 13 directly and relatively to their respective shafts, a splined bushing having a splined connection with the keyway of the shaft may be interposed between the interior of the bushing and the shaft, and the bushings 12 and 13 relatively attached to such splined bushings.

It will be noted that in the construction as above described the torque transmitted from one bushing, such as bushing 12 to the spring 16, is transmitted in the form of a direct thrust against the end of the spring and as the end of the spring is not laterally bent, it will not be subjected to bending stresses that are apt to break it. Furthermore in the event that the driven shaft tends to overrun the driving shaft or in the event that the driven shaft is reversely operated, there is no opportunity for the spring to loosen or unscrew from its hubs or bushings 12 and 13, inasmuch as the ends of the spring are anchored in place in their recesses by the set screws 21. Whenever the driving shaft is reversely driven or the driven shaft overruns the driving shaft, the end convolutions of the spring tend to contract or snub in the thread formations formed on the shank portions 14. It will, of course, be appreciated that any slight disalignment between the shafts or working of one shaft relative to the other is taken up by those convolutions of the spring which are suspended between the bushings 12 and 13.

Figure 4:
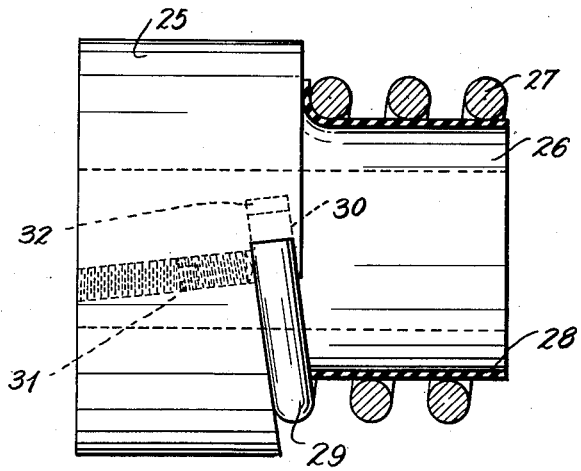
Fig. 4 is a partial view illustrating a modified form of construction.

In Fig. 4 there is illustrated a modified form of construction wherein the coupling is made up of two bushings, only one of which is illustrated at 25. This bushing has a reduced shank 26 about which the end convolutions 27 of the spring are disposed. A rubber sleeve 28 is interposed between these convolutions and the reduced portion 26 and serves as a silencer preventing direct metal-to-metal engagement between the spring and the reduced portions of the bushings. The end of the spring, indicated at 29 extends into a partial thread formation formed on the enlarged portion of the bushing and into a recess 30 formed at the end thereof. This end is locked in place by means of a set screw 31 arranged in a drilled and tapped hole extending longitudinally of the bushing. 32 indicates a thrust plate or disc which may be of hardened material or may be formed of compressed fiber.

In this form of construction as above described, the torque is transmitted in the form of a direct thrust to the end of the spring which is locked against loosening by the set screw 31 so that it can not be withdrawn from within the recess 31, in the event that the driven shaft tends to overrun the driving shaft or the driving shaft is reversely driven.

From the above described construction it will be appreciated that an improved flexible coupling is provided which is so designed as to avoid the use of laterally bent ends and have the torque transmitted thereto in the form of a direct thrust. Furthermore, the ends of the spring thus arranged are locked in place in recesses formed on the bushings.

Various changes may be made in the details of construction without departing from the spirit and scope of the invention as defined by the appended claims.

I claim:

1. A flexible coupling comprising a pair of opposed bushings applicable to approximately aligned shafts and a helical spring between the bushings having end convolutions continuing on the same pitch and diameter as the remaining convolutions of the spring to the extreme ends thereof, there being recesses formed in the bushings arranged in axial alignment with the ends of the spring, and means for locking the ends of the spring against withdrawal from the recesses, and thrust discs interposed between the ends of the spring and the bottoms of the recesses.

2. A flexible coupling comprising a pair of opposed bushings applicable to approximately aligned shafts, and a helical spring between the bushings, said bushing having reduced shank portions on which thread formations are formed in which the end convolutions of the spring are disposed, there being recesses in the bushings at the end of the thread formations in axial alignment therewith in which the ends of the spring are disposed, and means for locking the ends of the spring against withdrawal from the recesses.

3. A flexible coupling comprising a pair of opposed bushings applicable to approximately aligned shafts, a helical spring between the bushings having end convolutions disposed around the portions thereof, there being recesses in the bushings arranged in axial alignment with the ends of the spring, means for locking the ends of the spring against withdrawal from the recesses, and a resilient sleeve interposed between the spring and the bushings.

FRANK J. IRVING.

REFERENCES CITED

The following references are of record in the file of this patent:

UNITED STATES PATENTS

| Number | Name | Date |
| --- | --- | --- |
| 1,429,146 | Karge | Sept. 12, 1922 |
| 1,485,036 | Kingsley | Feb. 26, 1924 |
| 1,561,119 | Smith | Nov. 10, 1925 |
| 1,621,428 | Pederson et al. | Mar. 15, 1927 |
| 2,175,473 | Landrum | Oct. 10, 1939 |

FOREIGN PATENTS

| Number | Country | Date |
| --- | --- | --- |
| 339,453 | Great Britain | 1930 |